Feb. 18, 1941.  A. M. FLATTEM  2,231,994
LENS CUTTING MACHINE
Filed May 9, 1940  3 Sheets-Sheet 1

Inventor
Arthur M. Flattem
By his Attorneys

Feb. 18, 1941.  A. M. FLATTEM  2,231,994
LENS CUTTING MACHINE
Filed May 9, 1940  3 Sheets-Sheet 2
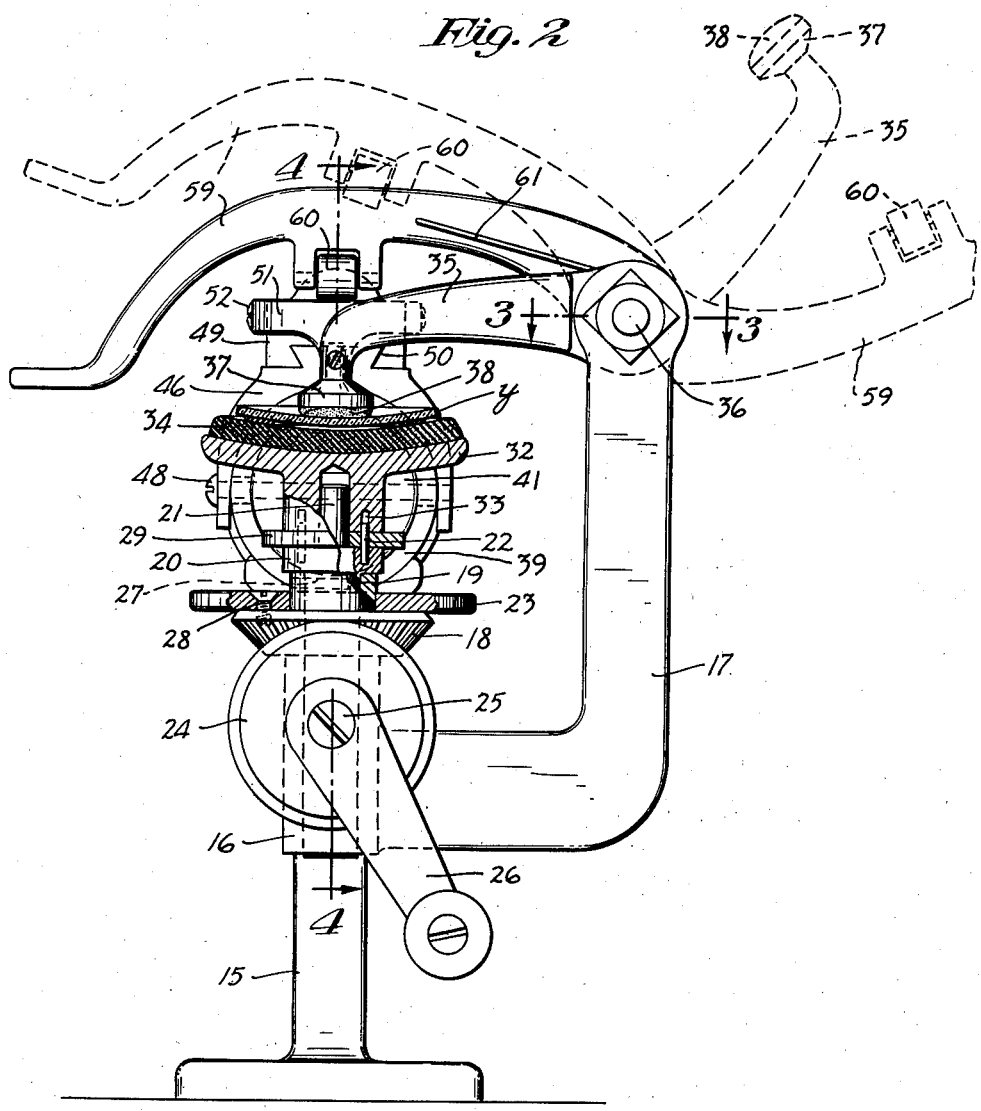
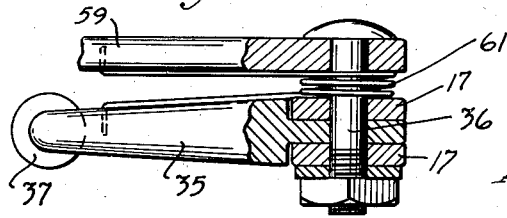
Inventor
Arthur M. Flattem
By his Attorneys Feb. 18, 1941.   A. M. FLATTEM   2,231,994
LENS CUTTING MACHINE
Filed May 9, 1940                 3 Sheets-Sheet 3
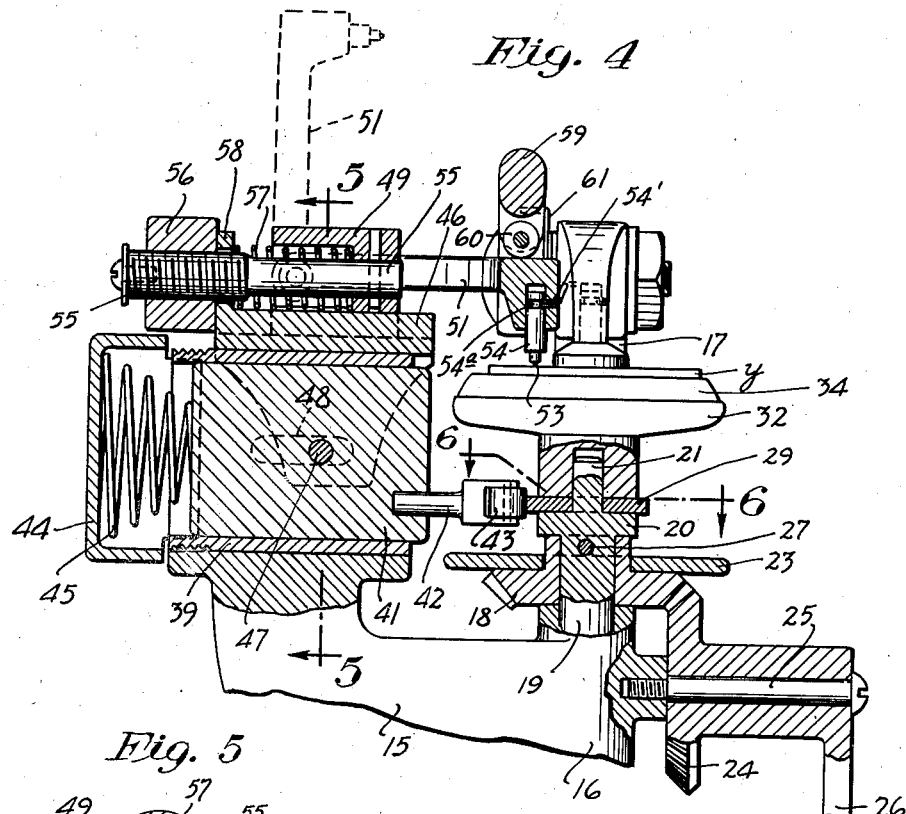
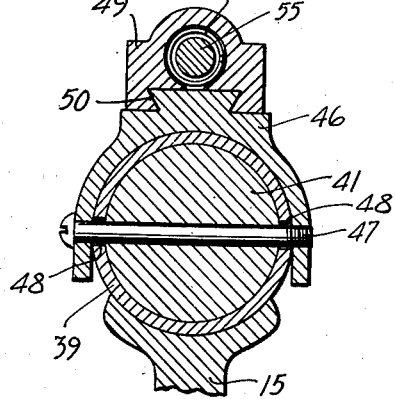
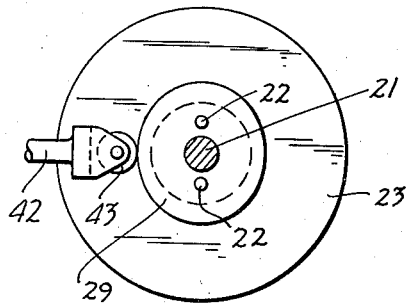
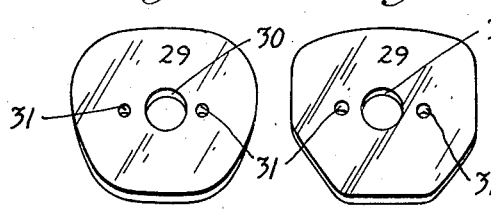
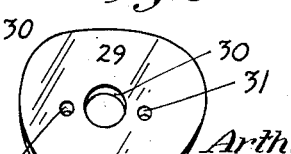
Inventor
Arthur M. Flattem
By his Attorneys Patented Feb. 18, 1941

2,231,994

UNITED STATES PATENT OFFICE 2,231,994

LENS CUTTING MACHINE

Arthur M. Flattem, Minneapolis, Minn.

Application May 9, 1940, Serial No. 334,212

6 Claims. (Cl. 33—28)

My invention provides an improved and highly efficient lens cutting machine and, generally stated, consists of the novel devices, combinations of devices and arrangement of parts hereinafter described and defined in the claims.

Particularly this invention relates to means for cutting the outline of optical lenses or lenses used in eye glasses. The demand for these lenses requires that they be cut with varioius outline such, for example, as round, oval, and various other outlines that vary from the round form.

The improved machine involves various novel and important features. It includes a rotary table or head to support and rotate the lens; the properly formed and selected template which is caused to rotate with the table; and novel means for detachably connecting the table and template to a template supporting head; a clamping arm for pressing the lens blank onto the rotary table for rotation therewith; a glass cutter; a tool holder for holding the glass cutter against the lens blank; and a support for the tool holder that is subject to movements under the action of the template. The invention also involves a main operating lever or handle that is connected to and operates on the tool holder and the lens clamping arm, in a novel manner. The support for the tool holder involves a main slide that is directly subject to the rotary template, and a supplemental support for giving micrometer adjustments to the cutter in respect to the template.

A commercial form of the invention is illustrated in the accompanying drawings wherein like characters indicate like parts throughout the several views.

Referring to the drawings:

Fig. 2 shows the machine chiefly in side elevation but with some parts in axial section;

Fig. 3 is a fragmentary plan view with some parts sectioned on the line 3—3 of Fig. 2, and with some parts broken away and other parts removed;

Fig. 4 is a view chiefly in vertical section taken on the line 4—4 of Fig. 2, but with some parts shown in full elevation, some other parts being broken away;

Fig. 5 is a section taken on the line 5—5 of Fig. 4;

Fig. 6 is a detail in horizontal section taken on the line 6—6 of Fig. 4;

Figs. 7, 8 and 9 are views substantially in plan but slightly in perspective showing templates varying in outline;

Figure 1:
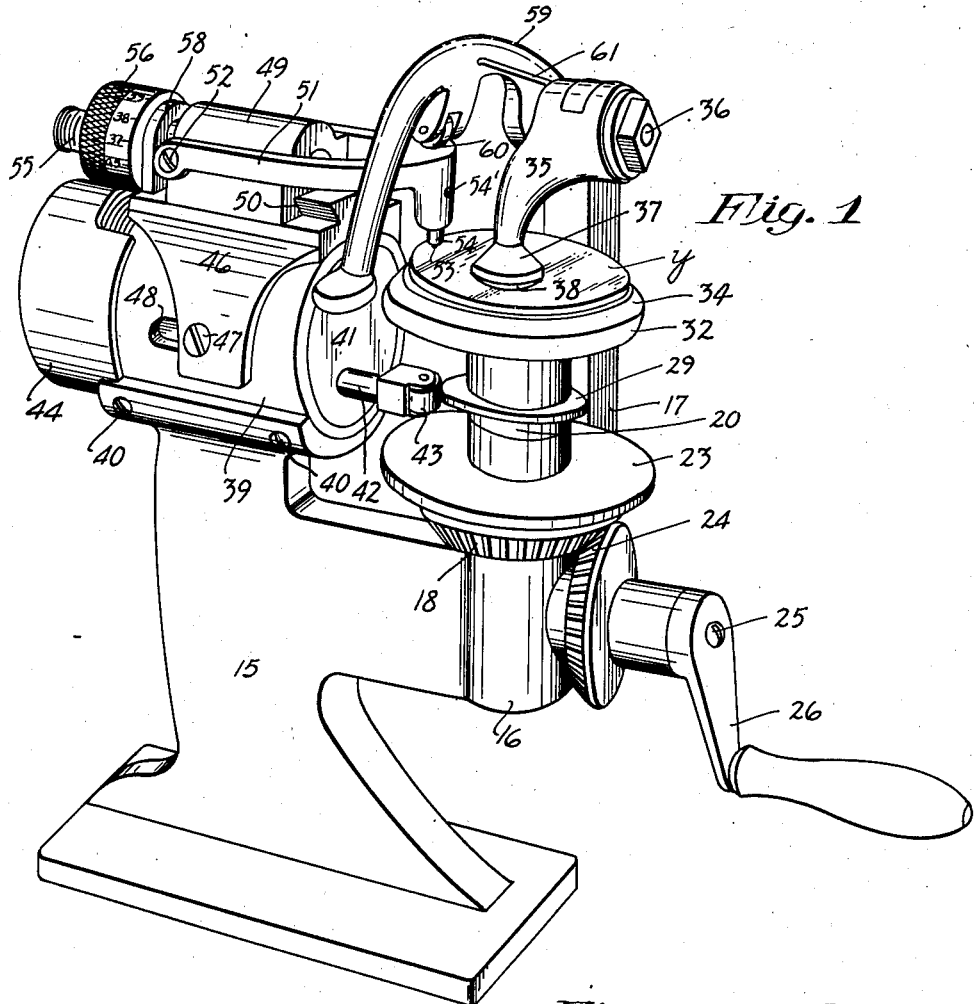
Fig. 1 is a view in perspective showing the complete machine.

The frame of the machine is in the form of a pedestal 15 provided with an upright bearing hub or sleeve 16 and an integrally formed or otherwise rigidly secured offset L-shaped arm 17. The numeral 18 indicates a bevel gear that is secured to a shaft 19 that depends therefrom and is journaled in the bearing sleeve or hub 16. The shaft 19 is formed as a part of or rigidly secured to a disclike lens-supporting head or flange 20, and said shaft is provided with an upwardly projecting centering pin or spindle 21. The head 20 has offset upwardly projecting coupling pins 22, for a purpose that will presently appear. Gear 18 is shown as provided with an outwardly projecting guard flange 23. Meshing with bevel gear 18 is a similar bevel gear 24 that is journaled to the bearing sleeve 16 at 25 and is provided with an operating crank 26. As shown, gear 18 is secured to shaft 19 by a set-screw 27 and guard flange 23 is secured to gear 18 by screws 28, but such structure, of course, can be varied.

The templates, which are disc-like structures, may take various forms, certain of which are best illustrated in Figs. 6, 7, 8 and 9. These templates are alike except that they vary in contour, and hence, are all indicated by the same numeral 29. All are provided with central perforations 30 and with offset perforations 31. The central perforations 30 fit the centering pin 21 while the perforations 31 fit the pins 22 and permit the latter to project above the same when a template is applied on the template supporting head 20.

To support a lens-forming blank y for rotary motion while it is being cut and its contour outlined, there is provided a rotary table 32, the hub of which has an axial bore that fits over the centering pin 21 and further has offset holes 33 that receive the pins 22 of the template supporting head 20 so that when the parts are assembled, as shown in Figs. 1, 2 and 3, not only the template but the lens-supporting table will be revolved around an axis that is coincident with the axis of shaft 19.

Optical lenses and the blanks for forming the same are almost universally concavo-convex, and hence, the upper surface of the table 32 is preferably made concave and provided with a correspondingly formed yielding cushion 34 which affords a cushion base for the lens blank and has sufficient frictional contact therewith to cause rotation of said blank when the table 32 is rotated.

To clamp the lens blank onto the table for rotation therewith, there is a clamping arm 35 pivoted at 36 and provided at its free end with a swivelled head 37 that engages the central portion of the lens blank. This head 37 is preferably formed with a soft face 38, and is free to rotate on the projected axis of the shaft 19.

The pedestal 15, at a point offset from the hub 16, has a cylindrical plunger guide 39, shown as rigidly but detachably secured thereto by screws 40. Slidable within the casing 39 is a cylindrical plunger 41, the inner end of which is shown as provided with a projecting rigidly attached stud 42 with a bifurcated head to which is pivoted a roller 43 that is subject to the direct action of the template when the latter is rotated. At its outer end the cylindrical casing 39 is provided with a cap 44 attached thereto by screw-threaded engagement, and hence, adjustable.

A coiled spring 45 is compressed between the cap 44 and the outer end of plunger 41 and exerts a yielding force that will keep the roller 43 pressed against the edge of the template 29.

Mounted on the top of the cylindrical casing 39 is a saddle-like bearing 46. A bolt 47 is passed through the depending flanges of the bearing 46, through slots 48 in the sides of the casing 39 and diametrically through the main slide 41, as best shown in Figs. 4 and 5. This bolt 47 holds the plunger 41 against rotation, locks the saddle bearing 46 for sliding movements with the plunger 41 and the slots 48 permit the common sliding movements of the said members 41 and 46.

A secondary slide 49 is mounted on top of the saddle bearing 46 preferably by dovetailed engagement shown at 50. The glass cutting tool is mounted on the free end of a tool-carrying arm preferably in the form of a yoke 51 that is pivoted to the sides of the supplemental slide 49, at 52. The cutting tool may take various forms. In the main drawings the cutting tool is a diamond 53 in one end of a tool-holding shank 54 that is held in the hub of the arm 51 preferably with freedom for slight oscillatory movements by a set-screw 54' that engages a notch 54a in said shank.

Means is provided for micrometer adjustments of the supplemental slide 49 in respect to the saddle bearing 46 and plunger or main slide 41. This micrometer adjustment is afforded by a stem 55 that is rigidly secured to and projects rearward from the slide 49 and has a threaded end on which works a graduated adjusting hub 56. A coiled spring 57 compressed between the slide 49 and a lug 58 on said slide 49 tends to impel the slide 49 forward and to hold the adjusting hub 56 against said lug 58.

The pivot 36 that connects the clamping arm 35 to bracket 17 is a nut-equipped bolt that also affords a pivot for a manually operated clamping lever 59 that operates on the free end of the tool-carrying arm 51. For direct engagement with the said tool carrier, lever 59 is provided with a roller 60. The arm 59 is connected to the clamping arm 35 by a torsion spring 61 that is coiled about the bolt 36 with its free ends attached, one to the arm 59 and the other to the said arm 35. This spring, when the lever 59 is depressed, yieldingly forces the clamping arm downward and when said arm 59 is raised or retracted, causes the clamping arm to be retracted therewith.

Figure 10:
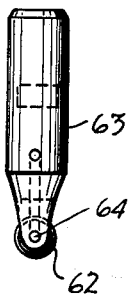
Fig. 10 is a view in side elevation showing a modified form of glass cutter in which a cutting wheel is employed.
Figure 11:
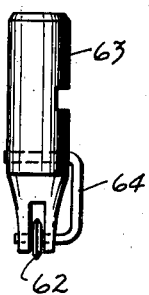
Fig. 11 is a front elevation of the parts shown in Fig. 10.
Figures 12, 13:
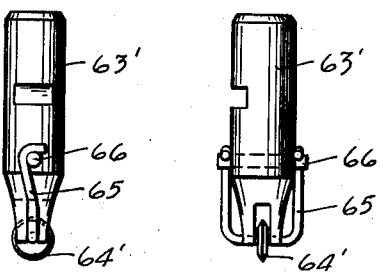
Fig. 12 is a side elevation corresponding to Fig. 10, but illustrating a slight modification of the cutter shown in Figs. 10 and 11.
Fig. 13 is a front elevation of the parts shown in Fig. 12.

The wheel-equipped glass cutter, shown in Figs. 10 to 13, inclusive, may, at will, be substituted for the diamond-equipped cutter whenever desired. In Figs. 10 and 11 the cutting wheel is indicated by the numeral 62 and its stem by the numeral 63. The wheel 62, as shown, is detachably connected to the stem 63 by a U-shaped coupling wire 64. In the structure illustrated in Figs. 12 and 13, the cutting wheel 64' is connected to the stem 63' by a U-shaped coupling 65 passed through said wheel, and engaged with notches in the forked end of the stem and with projecting pins or lugs 66 on the sides of said stem 63'.

Summary of Operation

To those familiar with this art, the operation of the above described machine is probably obvious, but may be briefly summarized as follows: When the table 32 is lifted from position, the template, which will give the desired form of lens, will be selected and placed on the template supporting head 20 with the pins 22 projecting upward therethrough and beyond the upper face of the template. Then the lens-supporting table is telescoped around the centering pin 21 and its pin seats 33 are telescoped over the pins 22. In this way the head 20, template 29, and table 32, are properly centered and locked together for common rotation when the crank 26 is manipulated. The lens blank, which will be larger than the desired completed lens, is then placed on the pad 34 of the table 32, as best shown in Figs. 1 and 2.

Under rotation of the template and the table 32, the template acting on the roller 43 of the main slide 41 will determine the outline that is to be given to the lens. However, the major axis of the outlined or cut lens will be determined by the distance that the diamond or other cutting tool is set away from the axis of the turn table 32; and this is determined by adjustments of the secondary slide 49 in respect to the main slide 41 and in respect to the axis of the turn table 32. When the cutting tool is thus set or positioned, the arm or lever 59 will be pressed down so that its rollers 60 will engage the free end of tool-carrying arm 51 and force the desired pressure against the lens. The same downward movement of the lever 59 causes the clamping arm to move downward and the padded face 38 of swivelled head 37 to engage the lens blank at the axis thereof. Then, when by manipulation of crank 26, the lens blank has been given one complete rotation, the complete outline for the finished lens is cut so that the outer margin beyond the guide line may be readily broken off.

The machine described has been made and put into use and found extremely efficient for the purposes had in view. It is not only easily adjustable to the different kinds of work, but operates with accuracy for any outline represented by the selected template or any size determined by the adjustments of the secondary slide in respect to the main slide. To reiterate, attention is again called to the fact that the contour or outline of the lens is determined by the selected template and the form of the said template, while the size of the cut lens is determined by setting of the secondary slide in respect to the main slide, and hence, the setting of the cutting tool in respect to the axis of the turn table.

In accordance with the statutes, I have disclosed and described in detail a commercial and preferred form of the invention, but it will be understood that various modifications of the illustrated features may be made without departing from the spirit of my invention and the scope of the appended claims presented.

What I claim is:

1. In a machine of the kind described, a rotary template supporting head, a template mounted thereon, a lens supporting table mounted on said template and connected thereto for rotation therewith and with said template head, means for rotating said template head and the parts mounted thereon, a tool carrier mounted for travelling movements toward and from the axis of said lens table, means whereby said tool carrier will be thus moved under the rotary action of said template, two spring connected pivoted arms, one having a head engageable with the lens at the axis of the lens table, and the other operative on said tool carrier to press the cutting tool toward the lens mounted on said table.

2. A machine of the kind described involving a template, a lens table, and means for imparting common rotary movements thereto, in combination with a tubular casing, a main slide mounted in said casing for sliding movements toward and from the axis of said template and provided with an extension subject to the action of said template, a saddle bearing mounted on said casing, said casing having longitudinal slots, a bolt extended through said saddle bearing, through said slots and diametrically through said main slide, a secondary slide slidably mounted on said saddle bearing, means for imparting micrometer adjustments to said secondary slide and in respect to said saddle bearing, a tool carrying arm pivoted to said secondary slide and provided at its free end with a depending glass cutter, means for depressing said tool carrier to render its glass cutter operative on a lens mounted on said table, and means for pressing the lens onto said lens table with freedom for rotation with said table.

3. A machine of the kind described involving a template, a lens table, and means for imparting common rotary movements thereto, in combination with a tubular casing, a main slide mounted in said casing for sliding movements toward and from the axis of said template and provided with an extension subject to the action of said template, a saddle bearing mounted on said casing, said casing having longitudinal slots, a bolt extended through said saddle bearing, through said slots and diametrically through said main slide, a secondary slide slidably mounted on said saddle bearing, means for imparting micrometer adjustments to said secondary slide and in respect to said saddle bearing, a tool carrying arm pivoted to said secondary slide and provided at its free end with a depending glass cutter, a clamping arm and a presser arm mounted on a common pivotal connection to the machine frame, a yielding connection between said two arms, said clamping arm having a swivelled head engageable with the lens, and said presser arm having a roller operative on the free end of said tool carrying arm.

4. In a machine of the kind described, a rotary template carrying head, means for rotating said head, a template mounted on said head, a lense table detachably mounted on said template, means connecting said head, template and table for common rotation, a main slide mounted in the machine structure for sliding action toward and from said template and having an element engageable with said template whereby the movements of said main slide will be controlled by rotation of said template, a secondary slide adjustably mounted on said main slide, means for setting said secondary slide in different adjustments on to said main slide, a tool carrier connected to said secondary slide for traveling movements therewith toward and from the common axis of said table, head and template, a glass cutting tool on said tool carrier, and two pressure-acting elements, one for pressing said lens against said table, and the other for pressing said cutting tool against said lens, said two pressure-acting elements being yieldingly connected whereby when one of said pressure-acting elements is operated, the other will also be thrown into action.

5. In a machine of the kind described, a rotary template carrying head, means for rotating said head, a template mounted on said head, a lens table detachably mounted on said template, means connecting said head, template and table for common rotation, a main slide mounted in the machine structure for sliding action toward and from said template and having an element engageable with said template whereby the movements of said main slide will be controlled by rotation of said template, a secondary slide adjustably mounted on said main slide, means for setting said secondary slide in different adjustments on to said main slide, a tool carrier connected to said secondary slide for traveling movements therewith toward and from the common axis of said table, head and template, a glass cutting tool on said tool carrier, means for pressing said lens on to said table and for pressing said cutting tool against said lens includes two arms pivotally mounted on the machine frame, said arms being yieldingly connected for simultaneous but differential pivotal movements, one of said arms having contact with said lens substantially at the axis thereof, and the other arm being engageable with said tool carrier to press the cutting tool thereof against said lens at a point eccentric to the axis thereof.

6. In a machine of the kind described, the combination with a lens table and template, and means for imparting common rotary movements to said lens table and template, of a pressure element arranged to press a lens on said table, a tool carrier mounted for movements toward and from the axis of said table under the action of said template, a glass cutter carried by said tool carrier, a second pressure element engageable with said tool carrier to press the said glass cutter into action on said lens, and a yielding connection between said two pressure elements whereby when the one is thrown into action the other will also be thrown into action by a common pressure-producing action.

ARTHUR M. FLATTEM.